US011082821B2

(12) United States Patent
Korkmaz et al.

(10) Patent No.: US 11,082,821 B2
(45) Date of Patent: Aug. 3, 2021

(54) METHOD FOR PROVISIONING AN APPLET WITH CREDENTIALS OF A TERMINAL APPLICATION PROVIDED BY AN APPLICATION SERVER AND CORRESPONDING OTA PLATFORM

(71) Applicant: GEMALTO SA, Meudon (FR)

(72) Inventors: Nagy Korkmaz, Gemenos (FR); Jean-François Gros, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/301,762

(22) PCT Filed: May 15, 2017

(86) PCT No.: PCT/EP2017/061574
§ 371 (c)(1),
(2) Date: Nov. 15, 2018

(87) PCT Pub. No.: WO2017/198595
PCT Pub. Date: Nov. 23, 2017

(65) Prior Publication Data
US 2019/0158996 A1 May 23, 2019

(30) Foreign Application Priority Data

May 16, 2016 (EP) .................................. 16305568

(51) Int. Cl.
*H04W 4/50* (2018.01)
*H04L 29/06* (2006.01)
(Continued)

(52) U.S. Cl.
CPC ........... *H04W 4/50* (2018.02); *H04L 63/0853* (2013.01); *H04W 4/14* (2013.01); *H04W 12/068* (2021.01)

(58) Field of Classification Search
CPC ..... H04W 4/50; H04W 12/0608; H04W 4/14; H04L 63/0853
See application file for complete search history.

(56) References Cited

U.S. PATENT DOCUMENTS

| 2012/0172026 A1* | 7/2012 | Kwon ................... H04L 63/067 455/419 |
| 2012/0172089 A1* | 7/2012 | Bae ....................... H04L 63/067 455/558 |

(Continued)

FOREIGN PATENT DOCUMENTS

WO 2012091349 A2 7/2012

OTHER PUBLICATIONS

Elenkov, "Using the SIM card as a secure element in Android", Sep. 2013, Retrieved from the Internet: URL: https://nelenkov.blogspot.com/2013/09/using-sim-card-as-secure-element.html.

(Continued)

*Primary Examiner* — Jeffrey M Rutkowski
*Assistant Examiner* — Chae S Lee
(74) *Attorney, Agent, or Firm* — Buchanan Ingersoll & Rooney PC

(57) ABSTRACT

A method for provisioning an applet in a security element with credentials of a terminal application provided by an application server comprises: Sending a request to provision the applet with credentials from the terminal application to the applet; Sending an SMS message containing an identifier of the applet from the applet to an OTA platform; Adding the MSISDN of the security element by an SMSC located in front of the OTA platform in the header of the SMS; Requesting the credentials from the OTA platform to the application server; Sending from the application server to the OTA platform the credentials to be associated with the MSISDN; Sending from the OTA platform to the applet the credentials associated with the MSISDN; and Sending from (Continued)

the applet to the terminal application a message that it has been provisioned with credentials of the terminal application.

3 Claims, 3 Drawing Sheets

(51) Int. Cl.
*H04W 4/14* (2009.01)
*H04W 12/06* (2021.01)

(56) References Cited

U.S. PATENT DOCUMENTS

| | | | |
|---|---|---|---|
| 2012/0252531 A1 | 10/2012 | King et al. | |
| 2013/0260739 A1* | 10/2013 | Saino | G06F 9/547 455/419 |
| 2015/0127945 A1* | 5/2015 | Chastain | H04W 4/50 713/170 |
| 2015/0140960 A1* | 5/2015 | Powell | H04L 12/1457 455/406 |
| 2015/0303966 A1* | 10/2015 | Lee | H04W 4/12 455/466 |

OTHER PUBLICATIONS

Hart, et al., "Website Credential Storage and Two-Factor Web Authentication with a Java SIM", Correct System Design, Apr. 2010, pp. 229-236.

International Search Report (PCT/ISA/210) dated Jul. 10, 2017, by the European Patent Office as the International Searching Authority for International Application No. PCT/EP2017/061574.

Written Opinion (PCT/ISA/237) dated Jul. 10, 2017, by the European Patent Office as the International Searching Authority for International Application No. PCT/EP2017/061574.

* cited by examiner

METHOD FOR PROVISIONING AN APPLET WITH CREDENTIALS OF A TERMINAL APPLICATION PROVIDED BY AN APPLICATION SERVER AND CORRESPONDING OTA PLATFORM

The present invention enters in the scope of telecommunications and in particular in the provisioning of credentials for an application present in a telecommunication terminal.

More precisely, the present invention concerns among others a method for verifying seamlessly the MSISDN (Mobile Station International Subscriber Directory Number) of an end-user when he wants to subscribe to a service identifying the subscriber identity based on his MSISDN. The MSISDN is the telephone number that is assigned to a mobile user.

There are a large number of handset applications (or terminal applications in general) that, are identifying the end-user with his MSISDN, for example WiFi Offload applications, VoLTE, VoWiFi, VoIP, etc . . . .

Figure 1:
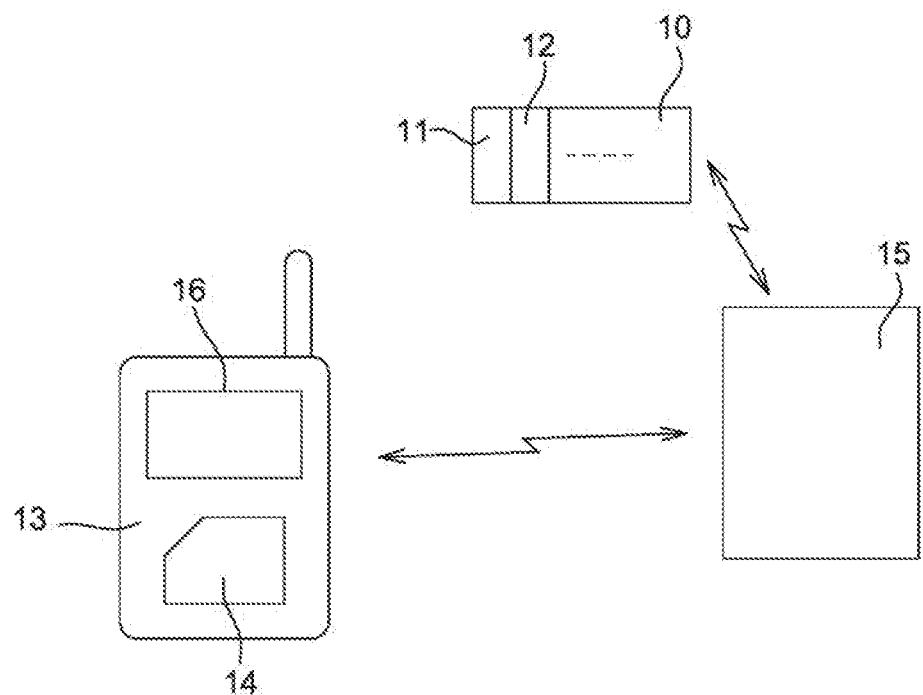

FIG. 1 represents a system in which an application server 10 containing applications or services 11, 12 can interact with a terminal 13. Application server 10 acts as a service provider.

The terminal 13 is typically a handset a smartphone or a PDA and contains a security element 14, typically a SIM card, a UICC or an embedded UICC also called eUICC (UICC not extractable from the terminal 13). Terminal 13 can communicate with the network of a MNO (Mobile Network Operator) and especially with an OTA platform 15. This OTA platform 15 can communicate with the application server 10 and constitutes a bridge between the terminal 13 and the application server 10.

When the user of the terminal 13 wishes to download a service 11, 12 from the application server 10, it connects to the OTA platform 15 and downloads this service after having entered a login and a password. The service is then stored in the terminal 13 in a so called terminal application 16.

The application server 10 is for example a server belonging to Google™ or Apple™.

In order to activate the terminal application 16 in his terminal 13 (for instating it), the user has generally to enter his MSISDN for ensuring the application server 10 that the terminal 13 on which the application 18 has been downloaded is the one that is entitled to use it. This is called the "OTP solution". For this purpose, the application server 10 sends (via SMS) a OTP (One Time Password) to the terminal 13. The user has then to type in the OTP in the user interface of the handset application. The issue with solution is that it obliges the end-user to go "out" on the handset application, enter the SMS application, open the received SMS containing the OTP, read and remember the OTP, reopen the handset application and type in the OTP.

This is not a user friendly solution at all and it requires an additional authentication server (for generating and verifying the OTP).

Another known solution is called "GGSN solution". The gateway GPRS support node (GGSN) is a main component of the GPRS network. The GGSN is responsible for the internet working between the GPRS network and external packet switched networks, like the Internet and X.25 networks.

In this solution, the terminal application 16 sends a http request to the application server 10 through the GGSN, the GGSN intercepts the request and adds the MSISDN as a header. The application server 10 can then automatically know the MSISDN of the end-user. The issue here is that not all the MNOs are able and/or willing to change their GGSN behaviour in order to add the MSISDN in the request.

Another solution is called "mobile ID solution": The terminal application 18 asks the end-user to type his MSISDN and sends a http request to the server 10 with the MSISDN. The server sends a formatted SMS to a Mobile ID applet based on OTP. The applet prompts the end-user to confirm the request and sends back the response to the application server 10. The issue with this solution is that it requires a specific authentication server and a large applet (25 Kbytes) not easy to deploy (especially to SIMs already deployed) and requires large free memory space.

The problem solved by the present invention is to avoid impersonation and to ensure that the MSISDN belongs effectively to the end-user, in a user friendly manner.

More precisely, one of the purposes of the invention is to propose a solution that can be easily pre-deployed or even deployed during provisioning process.

Another purpose is to propose a solution that is user friendly with no end-user interaction (no manual entry of the MSISDN).

These purposes, among others are reached thanks to a method for provisioning an applet with credentials of a terminal application provided by an application server, the applet being comprised in a security element of a terminal, the method consisting in:

Sending a request to provision the applet with credentials from the terminal application to the applet;

Sending a SWS message containing an identifier of the applet, from the applet to an OTA platform;

Adding the MSISDN of the security element by a SMSC located in front of the OTA platform in the header of the SMS;

Requesting the credentials from the OTA platform to the application server;

Sending from the application server to the OTA platform the credentials to be associated with the MSISDN;

Sending from the OTA platform to the applet the credentials associated with the MSISDN;

Sending from the applet to the terminal application a message informing the terminal application that it has been provisioned with credentials of the terminal application.

The invention also concerns a computer program product implemented in an applet composed in a security element, the computer program product being configured to be operable to:

Send a SMS message containing ah identifier of the applet to an OTA platform, at the request of a terminal application to be provisioned with credentials;

Receive from the OTA platform the credentials of the terminal application and the MSISDN of the security element;

Send to the terminal application a message Informing the terminal application that it has been provisioned with credentials of the terminal application.

Finally, the invention concerns an OTA platform comprising means for:

Receiving from an applet comprised in a security element of a terminal a SMS message containing an identifier of the applet, the SMS message containing the MSISDN of the security element and a request for getting credentials for a terminal application present in the terminal;

Sending the request to an application server with the MSISDN;

Receiving from the application server the credentials to be associated with the MSISDN;

Sending to the applet the credentials associated with the MSISDN.

Figure 2:
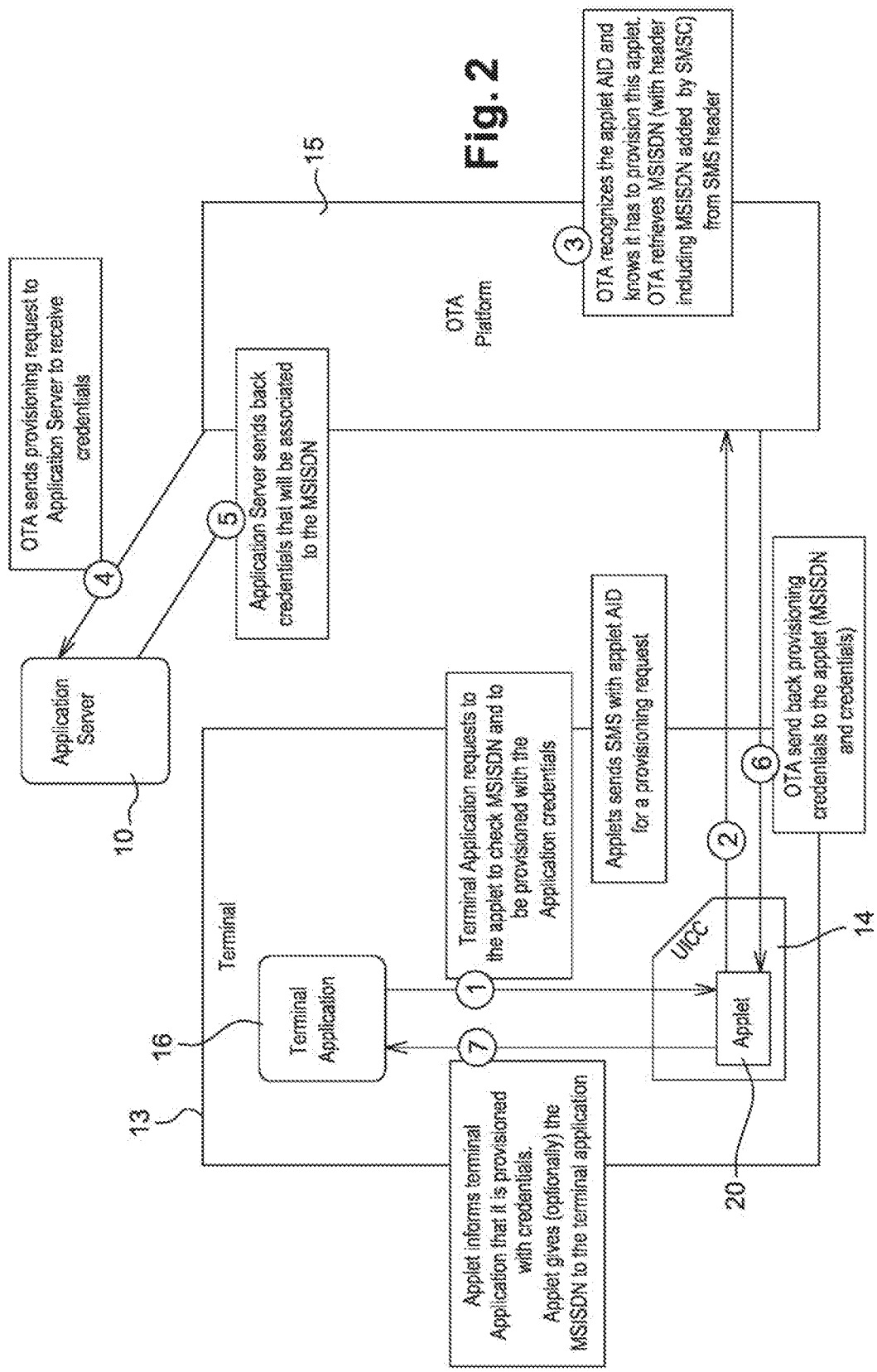
Figure 3:
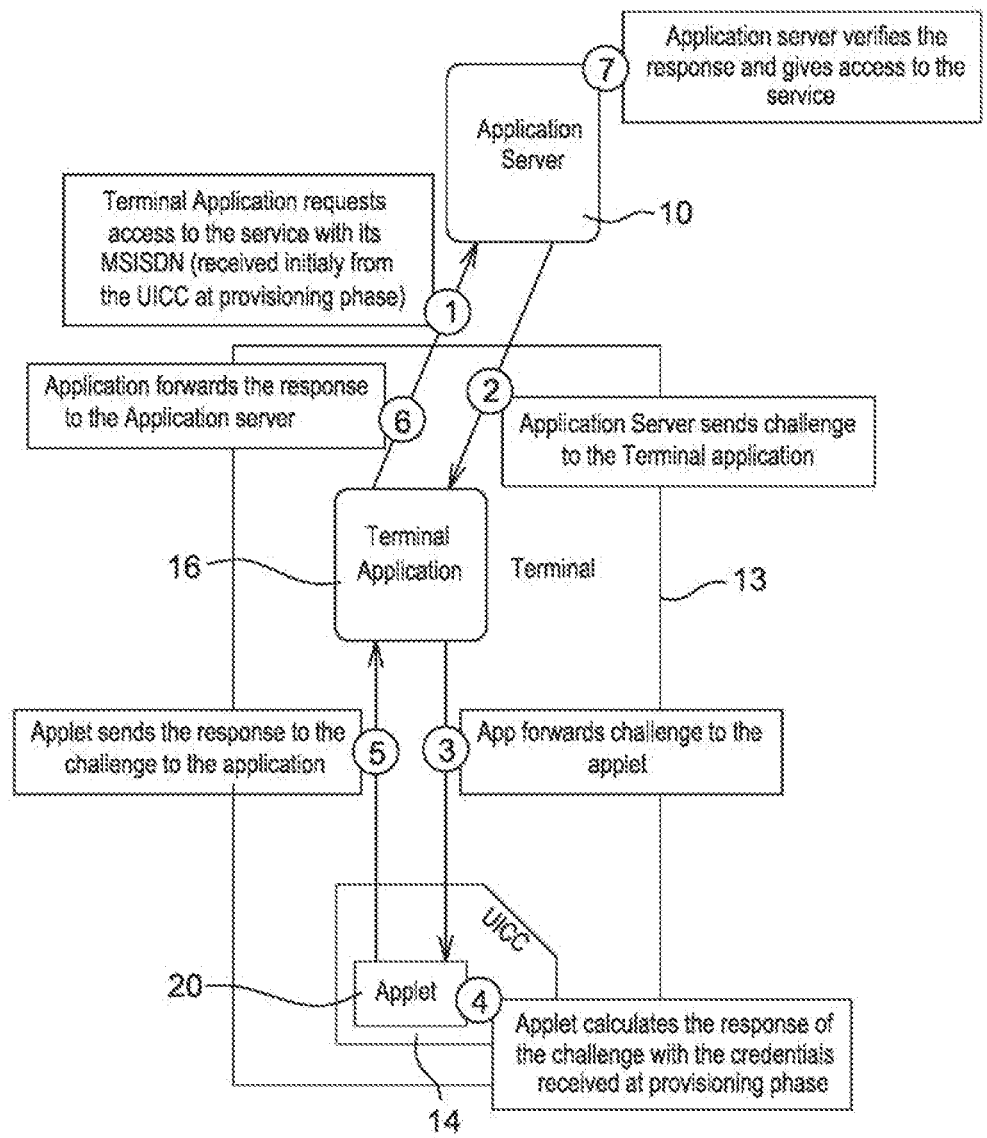

These features will now be described in regard of the following figures which describe:

FIG. 1 the state of the art;

FIG. 2 the provisioning steps of an applet with credentials of an application server according to the present invention;

FIG. 3 the access to a service of a terminal application provisioned according to FIG. 2.

FIG. 2 represents the provisioning steps of an applet with credentials of an application server according to the present invention.

The provisioning steps of this figure have the purpose to enrol the terminal application 16 with the application server 10. A terminal application 16 is one of the terminal applications 11 or 12 represented in FIG. 1. The enrolment has the purpose to store credentials of the application server 10 in the security element 14 without requiring from the end-user to enter his MSISDN in his terminal 13. The security element 14 contains, according to the invention, an applet 20 which function will now be described. Prior to this enrolment, the terminal application 18 has been downloaded in the terminal 13.

Seven main steps are represented in FIG. 2.

The first step (1) of the enrolment consists in sending from the terminal application 16 to the applet 20 a request to provision the applet 20 with credentials. These credentials are typically at the level of the application server 10 from which the terminal application 18 has been downloaded. The credentials of a terminal application 18 can for example consist in a security key. This request also consists in requiring to the applet 20 to check the MSISDN of the security element 14, here constituted by a UICC. In the scope of the invention, the terminal application 18 has access to the security element 14.

The second step (2) consists in sending from the applet 20 to an OTA platform 15 a SMS message containing an identifier of the applet 20 (for example its AID-AID standing for Application Identifier). An AID defined in ISO 7816-5 and is a sequence of bytes between 5 and 16 bytes in length. This SMS contains information requesting the provisioning of the applet 20 with credentials relative to the terminal application 18. The wireless network between the terminal 13 and the OTA platform 15 supports the sending of SMS (2G, 3G, or VoLTE for example).

The third step (3) consists in adding the MSISDN of the security element 14 by a SMSC not represented (Short Message Service Center) located in front of the OTA platform 15 in the header of the SMS (i.e. between the terminal 13 and the OTA platform 15). The SMSC has a table of correspondence between the received IMSI (or TMSI) transmitted by the terminal 13 when communication is established with the OTA platform and the MSISDN. When receiving this SMS, the OTA platform 15 extracts the applet identifier and understands that there is a request to provision the applet 20 with credentials of the terminal application 16.

The OTA platform 15 also retrieves from the header of the received SMS the MSISDN that has been added by the SMSC.

The fourth step (4) consists in requesting from the OTA platform 15 to the application server 10 credentials for the terminal application 16. In this request, at least the MSISDN of the security element 14 is transmitted to the application server 10.

The fifth step (5) consists in sending from the application server 10 to the OTA platform 15 the requested credentials to be associated with the received MSISDN. The credentials are unique for each MSISDN in order that if credentials are hacked, the hacker will not have access to the service provided to each end-user.

The OTA platform 15 then (at step 6) sends back to the applet 20 the requested credentials associated with the MSISDN. At this step, the applet 20 is provisioned with credentials (a key for example) and the MSISDN of the security element 14.

The seventh step (7) consists in sending from the applet 20 to the terminal application 16 a message informing the terminal application 16 that the applet 20 has been provisioned with credentials of the terminal application 16. Optionally, the applet 20 also transmits the received MSISDN to the terminal application 16.

FIG. 3 represents the access to a service of a terminal application provisioned according to FIG. 2. The access to a service does not require the presence of an OTA platform.

In a first step (1), the terminal application 16 requests access to a service provided by the application server 10. This request includes the sending of the MSISDN of the security element 14. If the MSISDN has net been transmitted optionally during step 7 of FIG. 2 to the terminal application 16, the terminal application 16 requests this MSISDN in a precedent step to the applet 20. The important point is that the terminal application must have the MSISDN in order to be able to transmit it to the application server 10.

In a second step (2), the application server 10 sends a challenge (a random value) to the terminal application 16 that towards this challenge (in a third step (3)) to the applet 20. The applet 20 then computes (step 4) the response to the challenge by using the credentials received at provisioning stage (step 6 of FIG. 2). The computation can be expressed by the following function F:

$$Response = F(credentials, challenge)$$

The applet then sends this response to the terminal application 16 (step 5).

In a sixth step (6), the terminal application 16 forwards this response to the application server 10 and in a final step (7), the application server 10 verifies the response (by using the sent challenge and the credentials assigned during the enrolment procedure to the MSISDN of the security element 14). If the response computed by the applet 20 is identical to the result of the same function computed at the level of the application server 10, the MSISDN is correct (the credentials assigned to the applet 20 correspond to the MSISDN used for getting these credentials during the enrolment phase of FIG. 2) and access to the service is allowed. Otherwise, access to the service is denied.

This process for accessing to a service occurs at each request of the end-user for accessing to the specifies service.

The present invention also concerns a computer program product implemented in the applet 20 comprised in the security element 14. According to the invention, the computer program product is configured to be operable to:

Send a SMS message containing an identifier of the applet 20 to the OTA platform 15, at the request of the terminal application 16 to be provisioned with credentials;

Receive from the OTA platform 15 the credentials of the terminal application 16 and the MSISDN of the security element 14;

Send to the terminal application 16 a message informing the terminal application 16 that it has been provisioned with credentials of the terminal application 16.

The present invention also concerns an OTA platform 15 comprising means for:

Receiving from the applet 20 comprised in the security element 14 of the terminal 13 a SMS message containing an Identifier of the applet 20, the SMS message containing the MSISDN of the security element 14 (added by the SMSC) and a request for getting credentials for the terminal application present in the terminal 13;

Sending the request to the application server 10 with the MSISDN;

Receiving from the application server 10 the credentials to be associated with the MSISDN;

Sending to the applet 20 the credentials associated with this MSISDN.

The advantages of the inventions are:

The size of the applet 20 is very limited (around 1 KB);

The enrolling method is very secured since it is based on a security element like a Sim, a UICC or a eUICC;

It does not require any change in the operator's network neither additional server.

The invention claimed is:

1. Method for provisioning an applet with credentials of a terminal application provided by an application server, said applet being contained in a security element of a terminal, said method comprising:

sending a request to provision said applet with credentials from said terminal application to said applet;

sending a short messaging service (SMS) message containing an identifier of said applet from said applet to an over-the-air (OTA) platform;

adding a mobile station international subscriber directory number (MSISDN) of said security element by a SMS Center located in front of said OTA platform in the header of said SMS message;

sending a request for said credentials from said OTA platform to said application server;

in response to the request for said credentials sent from said OTA platform to said application server, sending from said application server to said OTA platform said credentials to be associated with said MSISDN;

sending from said OTA platform to said applet said credentials associated with said MSISDN; and sending from said applet to said terminal application a message informing said terminal application that it has been provisioned with credentials of said terminal application.

2. A hardware security element having stored therein a computer program implemented in an applet, said computer program being configured to:

receive, from a terminal application, a request to provision said applet with credentials;

send a short messaging service (SMS) message containing an identifier of said applet to an over-the-air (OTA) platform receive, by said applet and from said OTA platform, a mobile station international subscriber directory number (MSISDN) that said OTA platform has determined from a header of said SMS message, and said credentials that said OTA platform has obtained from an application server for association with said MSISDN; and send, from said applet and to said terminal application, a message informing said terminal application that it has been provisioned with credentials of said terminal application.

3. A method implemented by an over-the-air (OTA) platform, said method comprising;

based on a request for getting credentials for a terminal application present in a terminal, receiving, by said OTA platform and from an applet comprised in a security element of said terminal, a short messaging service (SMS) message containing an identifier of said applet;

adding, by an SMS Center located in front of said OTA platform, a mobile station international subscriber directory number (MSISDN) of said security element in the header of said SMS;

sending, by said OTA platform and to an application server, a request for said credentials;

in response to the request for said credentials sent from said OTA platform to said application server, receiving, by said OTA platform and from said application server, said credentials to be associated with said MSISDN; and sending, by said OTA platform and to said applet, said credentials associated with said MSISDN.

* * * * *